United States Patent
Lolli et al.

(10) Patent No.: US 8,251,105 B2
(45) Date of Patent: Aug. 28, 2012

(54) AUTOMATIC KIT, WITH A SELECTOR VALVE, FOR REPAIRING AND INFLATING INFLATABLE ARTICLES

(75) Inventors: Sergio Lolli, Pesaro (IT); Maurizio Marini, Pesaro (IT)

(73) Assignee: Tek Global S.R.L., Pesaro (IT)

( * ) Notice: Subject to any disclaimer, the term of this patent is extended or adjusted under 35 U.S.C. 154(b) by 374 days.

(21) Appl. No.: 12/281,802

(22) PCT Filed: Mar. 5, 2007

(86) PCT No.: PCT/IB2007/000513
§ 371 (c)(1),
(2), (4) Date: Feb. 18, 2009

(87) PCT Pub. No.: WO2007/102066
PCT Pub. Date: Sep. 13, 2007

(65) Prior Publication Data
US 2009/0301602 A1    Dec. 10, 2009

(30) Foreign Application Priority Data
Mar. 7, 2006   (IT) .............................. TO2006A0166

(51) Int. Cl.
*B65B 31/00*   (2006.01)

(52) U.S. Cl. .......... 141/38; 141/104; 141/114; 141/313; 141/351; 81/15.6

(58) Field of Classification Search ................ 141/5, 38, 141/67, 100, 104, 105, 114, 193, 197, 231, 141/285, 313, 351; 222/372; 81/15.2, 15.6, 81/15.5; 137/223, 227; 152/309; 285/93
See application file for complete search history.

(56) References Cited

U.S. PATENT DOCUMENTS

| | | | |
|---|---|---|---|
| 6,904,932 B1* | 6/2005 | Haraughty | 137/231 |
| 7,789,110 B2* | 9/2010 | Marini | 141/38 |
| 2001/0017134 A1* | 8/2001 | Bahr | 128/204.18 |

FOREIGN PATENT DOCUMENTS

| | | |
|---|---|---|
| EP | 0 867 49 A2 | 9/1998 |
| WO | 2005/085028 A | 9/2005 |

* cited by examiner

*Primary Examiner* — Gregory Huson
*Assistant Examiner* — Jason K Niesz
(74) *Attorney, Agent, or Firm* — Ladas & Parry LLP

(57) ABSTRACT

A kit for repairing and inflating inflatable articles has a compressor unit for producing compressed air; a container containing sealing fluid injectable into the inflatable article by means of a stream of compressed air from the compressor unit; a fluid line designed to connect the compressor unit to the inflatable article; and a sensor for determining a connection status to the inflatable article.

23 Claims, 5 Drawing Sheets

AUTOMATIC KIT, WITH A SELECTOR VALVE, FOR REPAIRING AND INFLATING INFLATABLE ARTICLES

TECHNICAL FIELD

The present invention relates to an automatic kit for inflating and repairing inflatable articles, in particular tyres.

BACKGROUND ART

Tyre repair and inflation kits are known comprising an electrically powered compressor unit; and a container of sealing fluid injected, when necessary, into the tyre along a fluid line by means of a stream of compressed air from the compressor unit.

In actual use, however, the compressor unit may be operated inadvertently by the user, thus resulting in wastage of the sealing fluid.

DISCLOSURE OF INVENTION

It is an object of the present invention to provide an automatic kit designed to eliminate the aforementioned drawback.

According to the present invention, there is provided an automatic kit as claimed in Claim 1.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
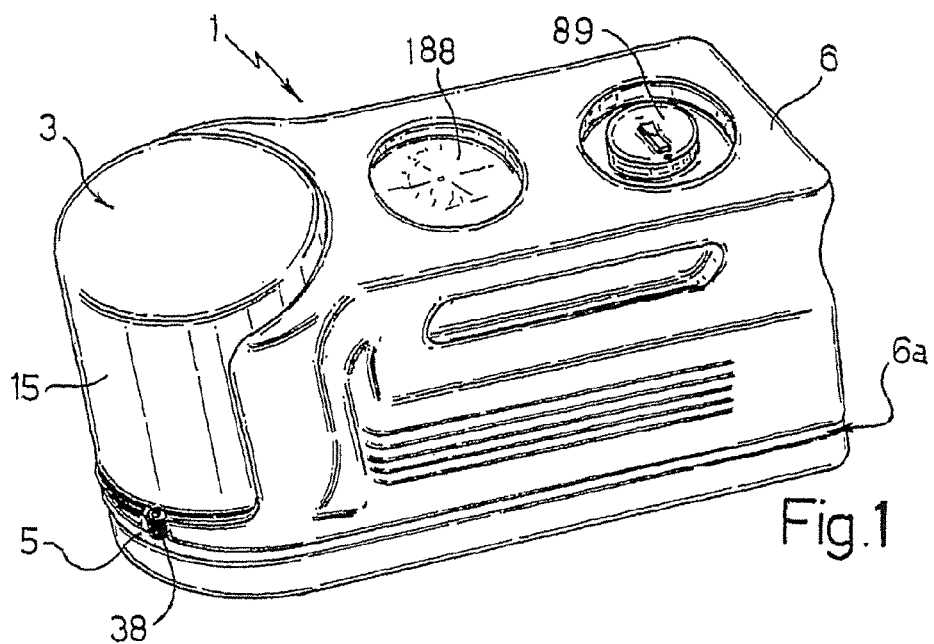
FIG. 1 shows a view in perspective of a kit comprising a container of sealing fluid and in accordance with the present invention.
Figure 2:
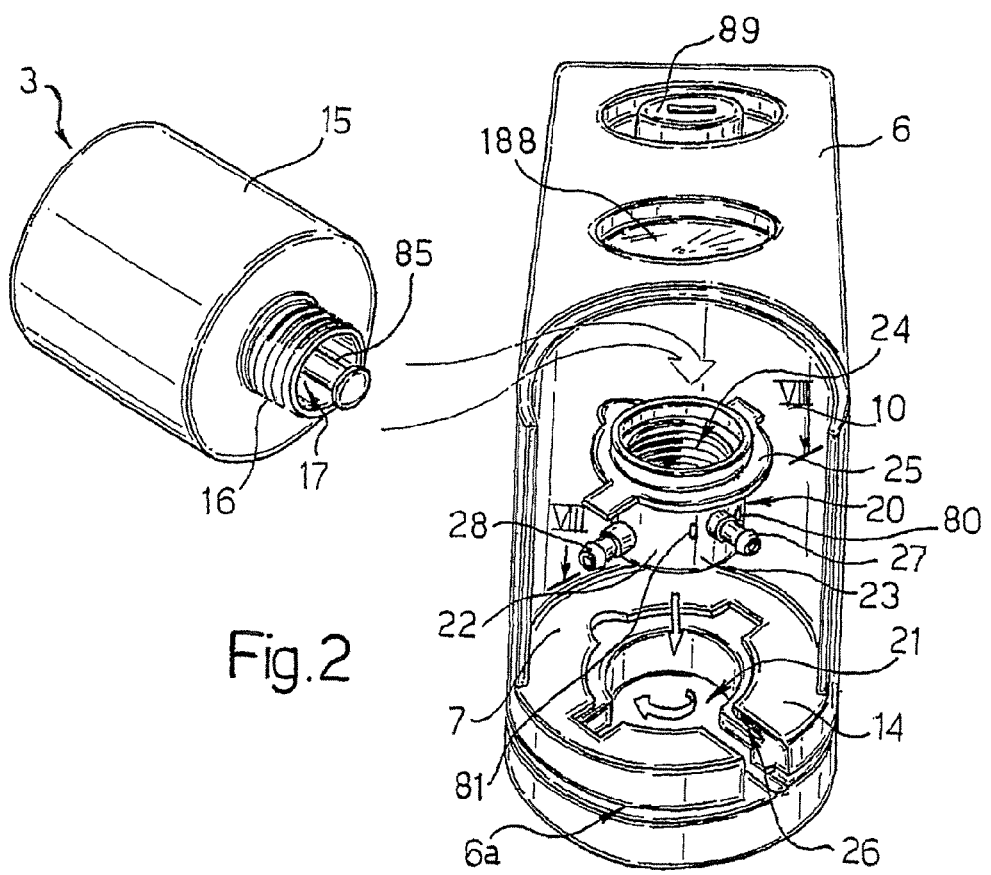
FIG. 2 shows a partly exploded view in perspective of the FIG. 1 kit.
Figure 3:
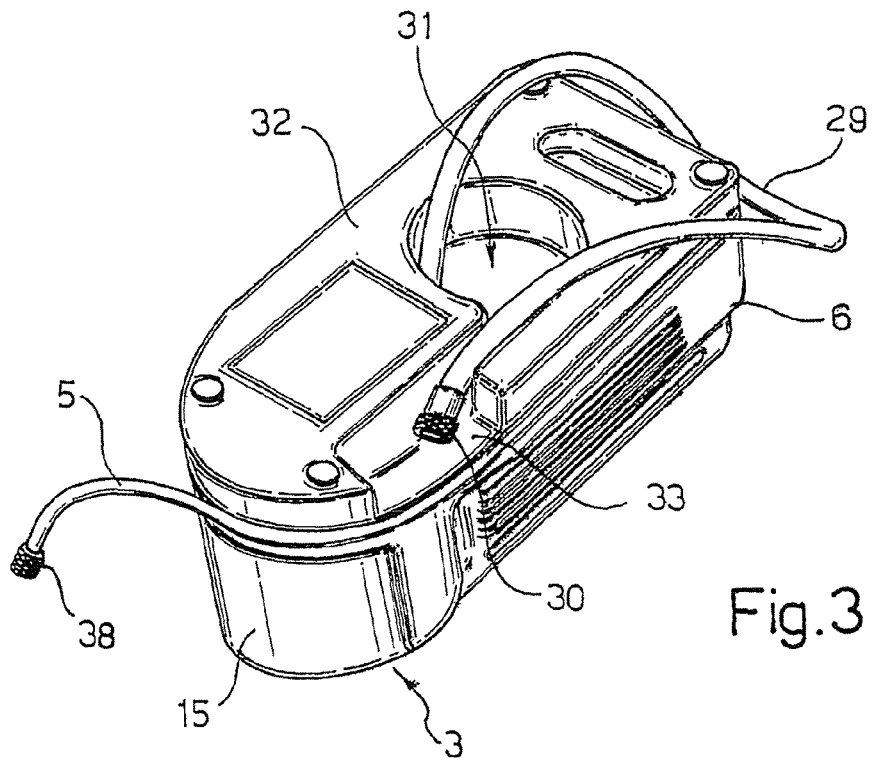
FIG. 3 shows an underside perspective view of the FIG. 1 kit partly disassembled.

With reference to FIGS. 1 to 3, number 1 indicates as a whole an automatic kit for fast inflation and repair of inflatable articles, in particular tyres.

Kit 1 substantially comprises an electrically powered compressor unit 2; a container 3 of sealing fluid; and a fluid line connecting container 3 to compressor unit 2 and comprising a hose 5 for connecting container 3 to a tyre (not shown).

Compressor unit 2 comprises, in known manner not shown, an electric motor, and a compressor driven by the electric motor, both of which are housed inside an outer casing 6.

Casing 6 is substantially parallelepiped-shaped, and defines, at one longitudinal end, a seat 7 for housing container 3 in an inverted vertical position. More specifically, seat 7 is defined laterally by a curved, substantially semicylindrical wall 10 of casing 6, and at the bottom by a circular base 14 projecting from curved wall 10.

Container 3 comprises a preferably bottle-shaped vessel 15 for containing sealing fluid and having an externally threaded neck 16 defining an opening 17; and a slide valve (not shown) housed inside opening 17 and integrated in container 3 to ensure fluidtight sealing of the container when the container is detached from the rest of kit 1.

Kit 1 also comprises a dispenser unit 20, which is housed stably but removably inside a recess 21 formed in base 14 of casing 6, and is connected removably to container 3 to secure the container in an inverted position to casing 6.

More specifically, dispenser unit 20 substantially comprises an inverted-cap-like central portion 22 having a substantially cylindrical lateral wall 23 and a base wall, which define an internally threaded cavity 24 into which neck 16 of vessel 15 is screwed; and a circular flange 25 extending radially from central portion 22 and defining a bayonet connection with corresponding fastening means 26 in base 14 of casing 6.

Dispenser unit 20 also comprises a first tubular fitting 27 projecting radially outwards from central portion 22; and a substantially pipe-like second tubular fitting 28 projecting radially outwards, close to a bottom wall of central portion 22, in a radial direction perpendicular to that of first tubular fitting 27.

Base 14 has a lateral opening through which first fitting 27 is accessible from outside casing 6 once dispenser unit 20 is bayonet connected inside recess 21 in base 14, e.g. by 45° rotation with respect to the insertion position shown in FIG. 2.

First fitting 27 is connected to hose 5, which, when not in use, may be wound about the casing and housed inside a peripheral groove 6a in casing 6. Second fitting 28, on the other hand, is connected to compressor 2 to feed compressed air into vessel 15. In actual use, the compressed air carries the sealing fluid to hose 5 and the tyre through first fitting 27.

Kit 1 therefore defines a first fluid line connecting the compressor unit to hose 5 through the inside volume of container 3 to feed the sealing fluid into the tyre by means of a stream of compressed air.

Kit 1 also comprises a second fluid line connecting compressor unit 2 directly to the tyre, and comprising a second hose 29 (FIG. 3) fitted on its free end with a ring nut connector 30. When not in use, hose 29 is stowed inside a cylindrical seat 31 formed in a bottom wall 32 of casing 6 and having a lateral opening 33 for housing connector 30 in a position clearly visible by the user.

Figure 4:
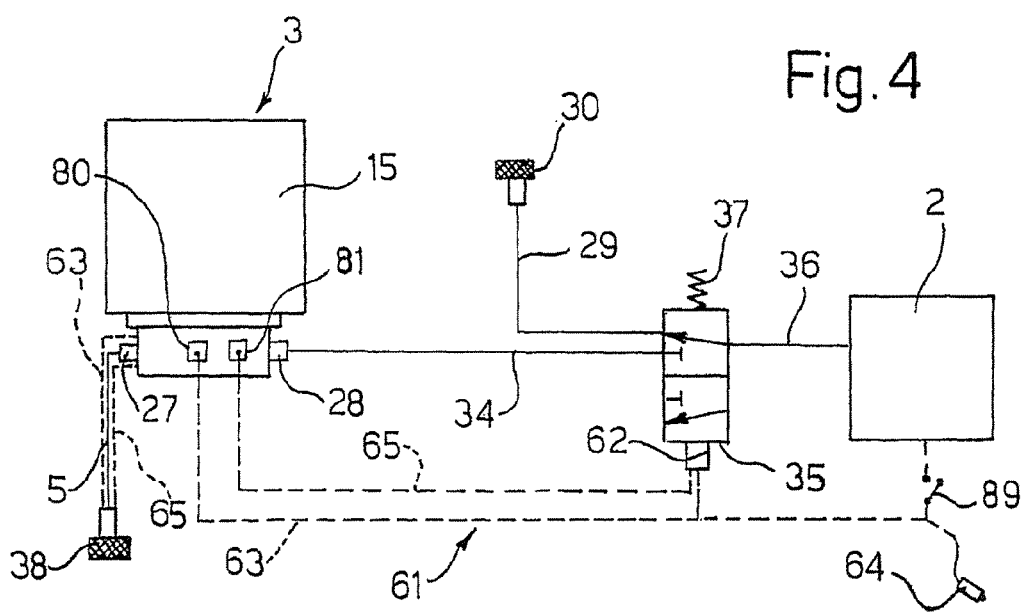
FIG. 4 shows a diagram of the internal circuitry and fluid lines of the FIG. 1 kit.

The FIG. 4 diagram shows fluidic connection of the two fluid lines to compressor unit 2.

More specifically, the first fluid line also comprises a fixed inner conduit 34 connecting second fitting 28 to one outlet of a three-port, two-position selector valve 35. The other outlet of selector valve 35 is connected to second hose 29, and the one inlet of selector valve 35 is connected by a second fixed inner conduit 36 directly to compressor unit 2. Fixed inner conduit 36 is shared by the first and second fluid line.

Selector valve 35 is preferably an electrically controlled servovalve, and provides for connecting compressor unit 2 to the tyre over the first or second fluid line, and for closing the other. In one embodiment, a spring 37 holds selector valve 35 stably in a position in which second hose 29 is connected to compressor unit 2, and the first fluid line is closed. Selector valve 35 is switched automatically by an electric signal depending on the connection status of hose 5 to the tyre, as explained in detail below.

Figure 5:
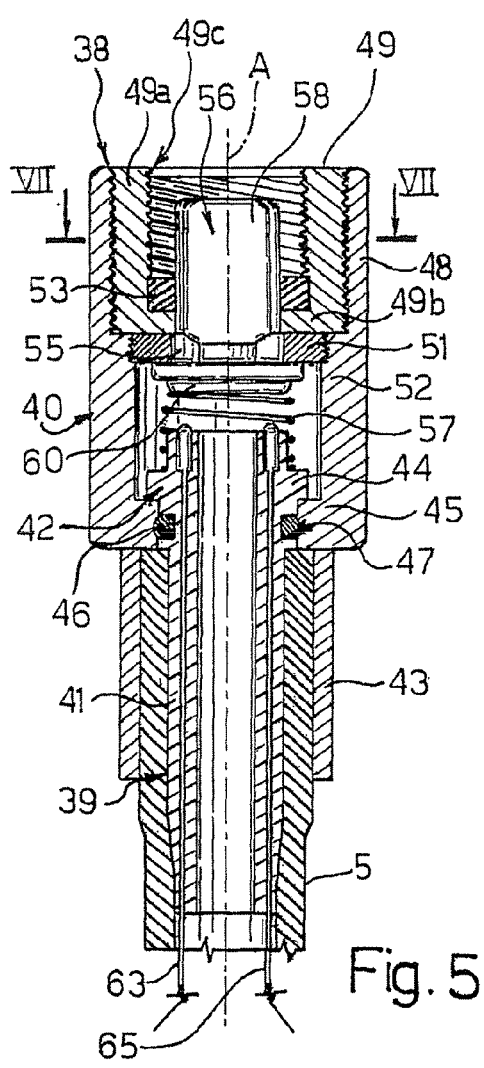
FIGS. 5 and 6 show an enlarged axial section of a detail of the FIG. 1 kit in two operating positions.
Figure 6:
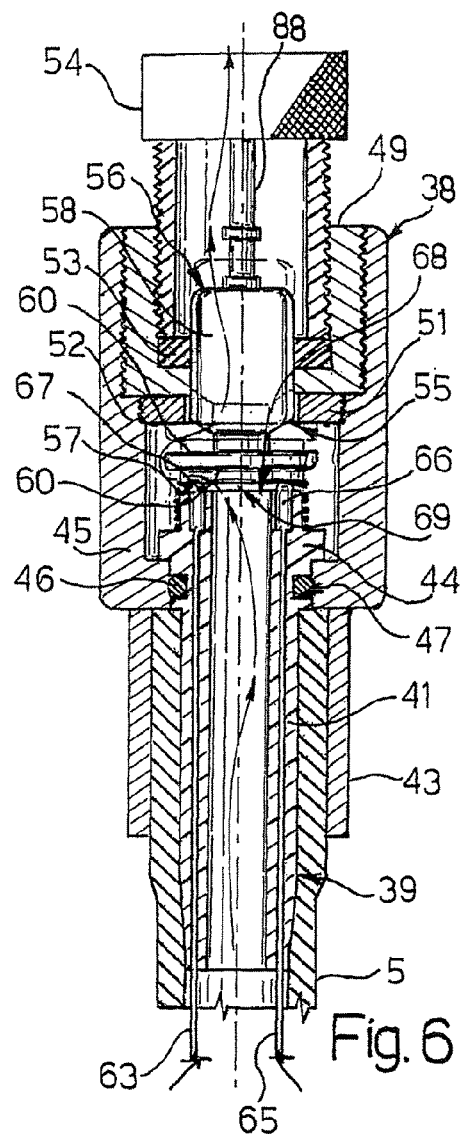

FIGS. 5 and 6 show a longitudinal section of an end portion of hose 5 fitted with a connecting device 38 for connecting the first fluid line to the tyre.

Connecting device 38 comprises a cylindrical plug 39 partly inserted inside hose 5 and having an axis A; and a tubular member 40 connected, coaxially with axis A, in freely rotating manner to cylindrical plug 39.

Cylindrical plug 39 comprises an inverted-pine-shaped body 41 inserted inside hose 5 and having an end portion 42 projecting axially from hose 5 and connected to tubular member 40. Body 41 is connected permanently to hose 5 by a sleeve 43 which radially compresses the lateral wall of hose 5.

End portion 42 defines a flange 44 axially detached from the edge of sleeve 43 and defining a seat for an inward-projecting bottom edge 45 of tubular member 40. Inward-projecting bottom edge 45 cooperates radially with an O-ring 46 housed inside an annular seat 47, interposed axially between flange 44 and body 41, to define a sliding fluidtight seat and permit rotation of tubular member 40.

At the opposite axial end to inward-projecting bottom edge 45, tubular member 40 comprises an internally threaded portion 48 connected to an inverted-cap-like insert 49.

Insert 49 comprises an internally threaded, cylindrical lateral wall 49a screwed inside threaded portion 48; and a bottom wall 49b opposite an axial opening 49c for engaging a tyre valve 54 (FIG. 6).

Insert 49 screws onto tubular member 40 and axially compresses a first sealing ring 51 facing cylindrical plug 39. More specifically, sealing ring 51 is compressed by bottom wall 49b against an annular surface 52 adjacent to threaded portion 48.

The face of bottom wall 49b facing opening 49c supports a second sealing ring 53 coaxial with first sealing ring 51, and which cooperates axially with valve 54 to define a fluidtight seal, when connecting device 38 is connected to valve 54.

An opening 55, coaxial with sealing rings 51 and 53, is defined in bottom wall 49b of insert 49, and houses in sliding manner an armature 56 maintained in a fluidtight sealing position by a helical spring 57 fitted to end portion 42 of cylindrical plug 39 and resting axially on flange 44.

Figure 7:
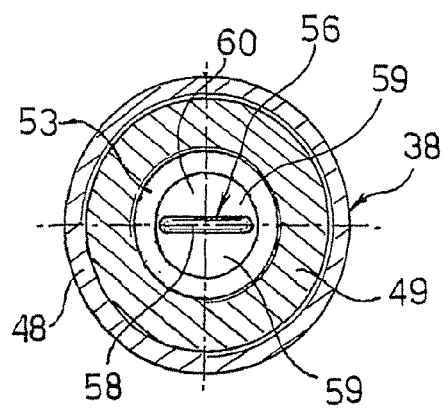
FIG. 7 shows a section, in a horizontal plane indicated in FIG. 5.

More specifically, armature 56 comprises a rod 58 having a narrow, substantially chisel-shaped rectangular section (FIG. 7) and defining two axial gaps 59 with the sides of the cylindrical lateral wall of insert 49; and a disk shutter 60 held by spring 57 against sealing ring 51 to fluidtight seal hose 5 when connecting device 38 is disconnected from the tyre.

Shutter 60 is made of electrically conducting material, and faces end portion 42 of cylindrical plug 39 to act as a switch of an electric circuit 61 connected to and for controlling switching of selector valve 35.

Electric circuit 61 (FIG. 4) comprises an actuator 62 for activating selector valve 35; a first conductor 63 for electrically connecting connecting device 38 directly to a plug 64 of kit 1 connectable to a current outlet (not shown) on the vehicle; and a second conductor 65 for connecting connecting device 38 electrically to plug 64 via actuator 62.

Conductors 63, 65 are housed inside casing 6 to reach selector valve 35, and have respective portions preferably housed inside hose 5 and protected by a respective insulating sheath to prevent undesired short-circuiting when connecting device 38 is disconnected from the tyre.

More specifically, conductors 63, 65 define, inside connecting device 38, respective terminals 66, 67 (FIG. 6), which are arranged so as to be short-circuited by shutter 60 when connecting device 38 is connected to tyre valve 54.

Terminals 66, 67 are preferably embedded in the wall of cylindrical plug 39—which is preferably made of insulating material—and project axially from a top face 68 of end portion 42. In actual use terminals 66, 67 define respective stops for the withdrawal movement of armature 56, when connecting device 38 is screwed to tyre valve 54.

In the above position, shown in FIG. 6, shutter 60 is detached from sealing ring 51, and opens a passage to axial gaps 59, to allow the sealing fluid to flow out through a substantially radial passage 69 defined between shutter 60 and top face 68.

Figure 8:
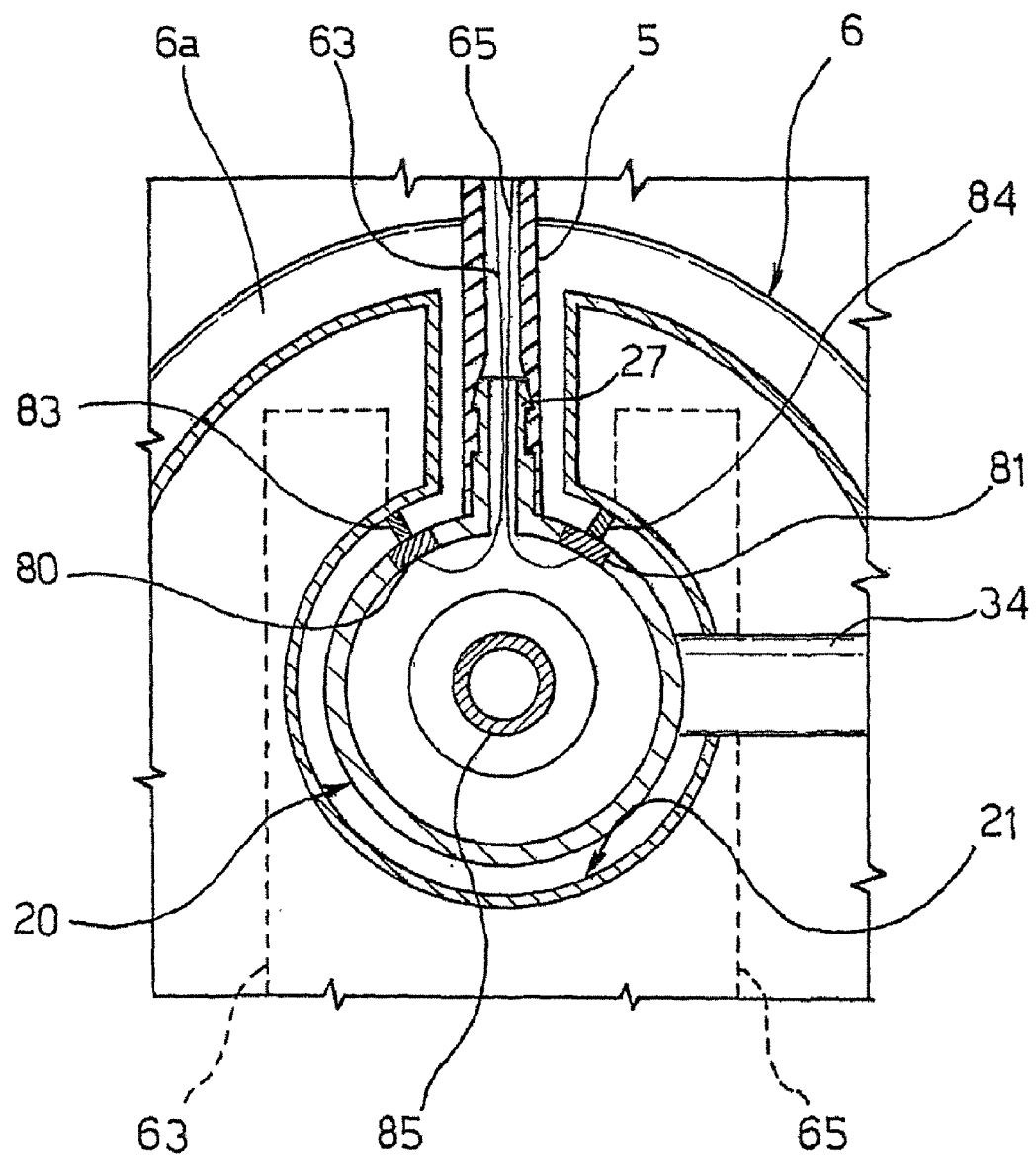
FIG. 8 shows a section, in a horizontal plane indicated VIII-VIII in FIG. 2, of a portion of the kit according to the present invention.

FIG. 8 shows a horizontal section of dispenser unit 20 when connected to casing 6, inside recess 21.

More specifically, lateral wall 23 of dispenser unit 20 has two electric terminals 80, 81 arranged symmetrically with respect to first fitting 27 and connected to respective portions of conductors 63, 65 from hose 5. Accordingly, a cylindrical wall 82 of casing 6, radially defining recess 21, supports two electric terminals 83, 84, which cooperate respectively with terminals 80, 81 when dispenser unit 20 is connected in the operating position to casing 6 by the bayonet connector described. Terminals 83, 84 are connected to respective portions of conductors 63, 65 connected respectively to plug 64 and actuator 62 of selector valve 35.

FIG. 8 also shows a cross section of a tubular member 85 fitted to vessel 15 and connected fluidically to second fitting 28 to feed compressed air into vessel 15.

In actual use, vessel 15 is connected permanently to dispenser unit 20; and dispenser unit 20 is set in an angular position in which it is connected rigidly to casing 6 by the bayonet connector, and terminals 80, 83 and 81, 84 contact electrically to permit electric current flow.

In this condition, kit 1 can be used to check and adjust tyre pressure, or to repair a damaged, in particular, punctured tyre.

To check tyre pressure, connector 30 is screwed to the tyre valve, and pressure is indicated on a gauge 188 (FIGS. 1 and 2) with a dial on casing 6.

To increase pressure, plug 64 is connected to the current outlet on the vehicle, and compressor unit 2 is powered by means of a switch 89 on casing 6. Selector valve 35 is maintained by spring 37 in the FIG. 4 position, and connects compressor 2 directly to hose 29. To repair a damaged tyre, hose 5 is screwed to valve 54 by means of connecting device 38. When so doing, armature 56 is pushed towards terminals 66, 67 by the central rod 88 of valve 54, and opens the passage through opening 55.

As hose 5 is screwed further, armature 56 backs up further until shutter 60 comes to rest on and short-circuits terminals 66, 67 to power actuator 62 and switch selector valve 35 in opposition to spring 37. Compressor 2 is thus connected to container 3 over the first fluid line, and the compressed air from compressor 2 feeds the sealing fluid into the tyre.

When connecting device 38 is unscrewed, armature 56 is pushed by helical spring 57 to close the passage to opening 55; shutter 60 is detached from terminals 66, 67, thus breaking electric circuit 61 to cut off power to actuator 62; and spring 37 switches back selector valve 35.

When using kit 1, armature 56 therefore acts as a sensor, in particular a contact sensor, to automatically switch selector valve 35 by means of terminals 66, 67 when connecting device 38 is connected to tyre valve 54.

Once the repair is completed, vessel 15 can be unscrewed from the dispenser unit and changed. Dispenser unit 20 may also be removed for maintenance. In which case, unit 20 is rotated and extracted, thus disconnecting terminals 80, 83 and 81, 84.

Figure 9A:
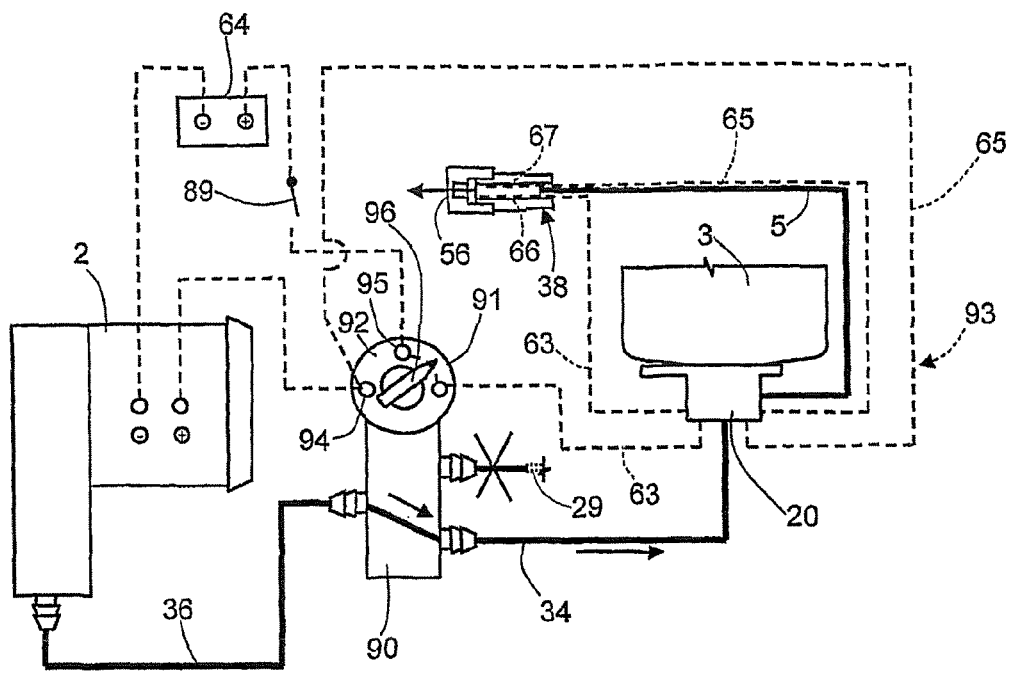
FIGS. 9a and 9b show diagrams of the internal circuitry and fluid lines, in respective operating configurations, of a further embodiment of a kit in accordance with the present invention.
Figure 9B:
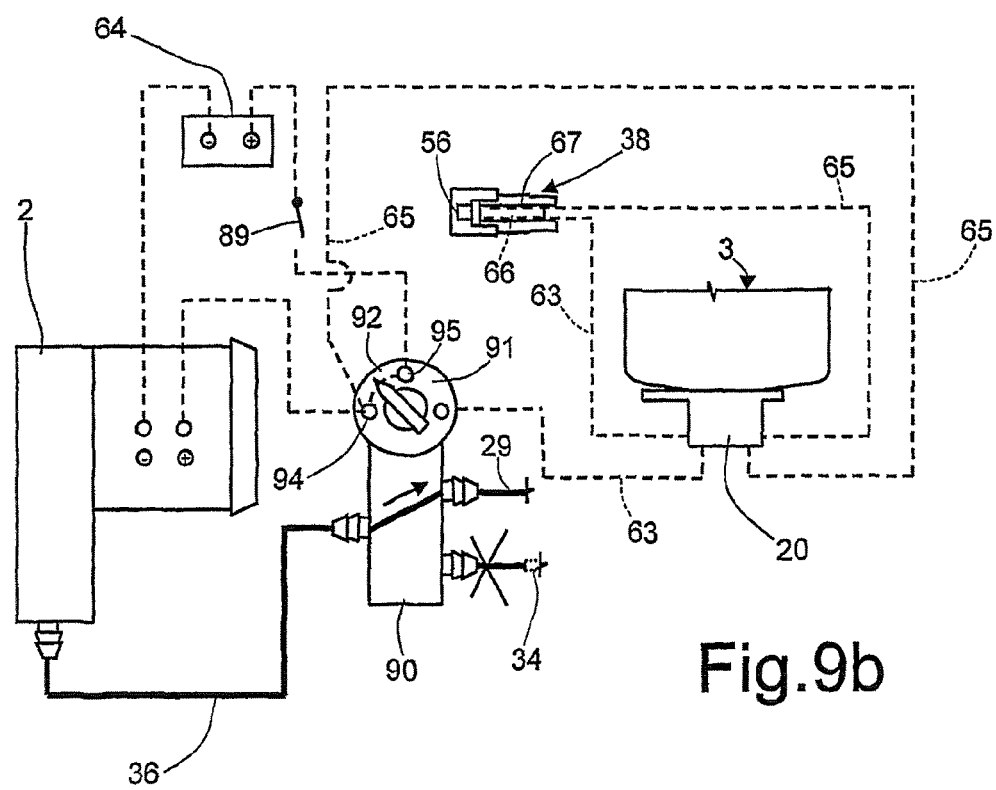

FIG. 9 shows a diagram of a second embodiment of the present invention, in which parts identical or functionally equivalent to those already described are indicated using the same reference numbers.

More specifically, FIG. 9 shows compressor unit 2 connected by fixed inner conduit 36 to a hand-operated selector valve 90, the two outlets of which are connected respectively to hose 29 to define the second fluid line, and to inner conduit 34 and, via dispenser unit 20, to hose 5 to define the first fluid line. Connecting device 38 of hose 5 comprises armature 56, as in FIGS. 5, 6.

The FIG. 9 diagram shows an electric circuit 93 comprising plug 64, switch 89, and the switch defined by armature 56 and terminals 66, 67 in connecting device 38. Electric circuit 93 also comprises two switches 91 and 92. More specifically, the positive pole of plug 64 is connected to terminal 66 by switch 89, by switch 91 in series with switch 89, and by conductor 63.

Terminal 67 is connected to the positive pole of plug 64 by conductor 65, switch 92, and switch 89.

More specifically, switch 92 has a terminal 94 connected to conductor 65, and a terminal 95 shared with switch 91. Terminal 85 is connected to switch 89, so switches 91, 92 are parallel to the positive pole of plug 64. The other terminal of switch 91 is conveniently connected to conductor 63.

Terminal 94 is connected to the negative pole of plug 64 via compressor unit 2.

In actual use, switches 91, 92 are closed alternatively by a knob 96, which thus activates selector valve 90.

In the configuration described above, when knob 96 closes switch 91 (FIG. 9a), selector valve 90 switches simultaneously to pressurize the first fluid line. Compressor unit 2 is only activated when switch 89 and armature 56 simultaneously close circuit 93.

Otherwise, if armature 56 does not short-circuit terminals 66, 67, electric circuit 93 is open, and compressor unit 2 is not powered, even if switch 89 is closed.

When knob 96 closes switch 92 (FIG. 9b), switch 91 is opened, and current flows through terminal 94 to compressor unit 2, without flowing through conductors 63, 65, even if terminals 66, 67 are short-circuited by armature 56. At the same time, selector valve 90 is switched by knob 96 to pressurize the second fluid line.

The advantages of kit 1 as described are as follows. Using a sensor, i.e. armature 56, to pressurize the first fluid line makes the kit safer to use, and prevents wastage of the sealing fluid.

Using a contact sensor, armature 56 can be used as both a sensor and electric switch to obtain a highly compact, relatively straightforward, low-cost device.

If the kit comprises a first and second fluid line, using a selector valve 90 equipped with switch 91 associated with connecting device 38, the desired result is achieved using low-cost component parts.

Using a selector valve 35 activated automatically by armature 56 provides for pressurizing the fluid line actually connected to the inflatable article, and prevents activating the other inadvertently.

The fact that armature 56 and terminals 66, 67 are fitted to the connecting device of the first fluid line reduces the number of switching operations, and therefore stress, of selector valve 35. Kit 1, in fact, may be assumed to be used mostly for adjusting pressure by means of the first fluid line.

Clearly, changes may be made to kit 1 as described and illustrated herein without, however, departing from the scope of the present invention as defined in the accompanying Claims.

In particular, armature 56 and terminals 66, 67 may be fitted instead or also to the second fluid line.

A sensor-controlled selector valve 35 may be used in kits featuring sealing fluid dispenser systems other than those described.

Switches 81, 82 may even be combined with automatic selector valve 35, and preferably activated by the slide of valve 35 to indicate correct positioning of the slide.

The invention claimed is:

1. A kit for repairing and inflating inflatable articles, comprising
   a compressor unit for producing compressed air;
   a vessel containing sealing fluid injectable into said inflatable article by means of a stream of compressed air from said compressor unit;
   a fluid line designed to connect said compressor unit to said inflatable article;
   a sensor for determining a connection status to sad inflatable article;
   a hose for connecting the container to said inflatable article;
   a connecting device for connecting the hose to the inflatable article; and first and second electrical terminals within said connecting device;
   a dispenser unit connected fluidically to said fluid line to allow compressed air into said vessel and sealing fluid out of said container;
   said dispenser unit comprising third and fourth electrical terminals connected electrically to said first and second electrical terminals respectively, said electrical connection being designed such that when fluid is to flow through said fluid line current flows to the compressor only if said terminals are short circuited.

2. A kit as claimed in claim 1, wherein said sensor is a contact sensor.

3. A kit as claimed in claim 2, which further comprises an electric circuit for controlling pressurization of said fluid line; and in that said sensor defines a switch of said electric circuit.

4. A kit as claimed in claim 3, which further comprises a second fluid line connecting said compressor unit directly to said inflatable article; and a selector valve that can be switched to connect said compressor unit selectively to said fluid line or to said second fluid line; and wherein said fluid line comprises a portion (5) along which said sealing fluid flows when said compressor unit (2) is activated.

5. A kit as claimed in claim 4, wherein said electric circuit comprises a second switch designed to close when said selector valve is set to a first position.

6. A kit as claimed in claim 5, wherein said electric circuit comprises a third switch designed to close when said selector valve is set to a second position and said second switch is open.

7. A kit as claimed in claim 6, wherein said electric circuit comprises a fourth switch for opening or closing said electric circuit independently of the position of said selector valve.

8. A kit as claimed in claim 4, wherein said selector valve is a hand-operated valve.

9. A kit as claimed in claim 4, wherein said selector valve is a servovalve connected to said electric circuit to switch automatically when electric current flows.

10. A kit as claimed in claim 9, wherein said fluid lines comprise at least one hose; and connecting means fitted to said hose and connectable to an inflation valve of said inflatable article; and in that said sensor is housed in said connecting means.

11. A kit as claimed in claim 10, wherein said connecting means further comprises a member moveable between a first position when said connecting means is not connected to an inflatable article and a second position when said connecting means is connected to an inflatable article said member comprising said sensor and defining a closure for fluidtight sealing said connecting means when said sensor moveable member is in said first position.

12. A kit as claimed in claim 11, further comprising an elastic member cooperating with said sensor to maintain said first position.

13. A kit as claimed in claim 12, wherein said sensor is movable axially inside said connecting means.

14. A kit as claimed in claim 10, wherein the connecting means comprise a cylindrical plug inserted inside said hose; and a tubular member connected in rotary manner to said cylindrical plug and housing said sensor.

15. A kit as claimed in claim 14, wherein said electric circuit comprises a first and second electric terminal embedded in said cylindrical plug.

16. A kit as claimed in claim 1, wherein said sensor is fitted to said fluid line.

17. A kit as claimed in claim 15, wherein said container comprises a vessel containing said sealing fluid; and a dispenser unit connected fluidically to said fluid line to allow compressed air into said vessel and said sealing fluid out of said vessel; said dispenser unit comprising a third and fourth electric terminal connected electrically to said first and second electric terminal respectively.

18. A kit as claimed in claim 4, characterized by comprising an elastic member cooperating with said selector valve to keep said selector valve in such a position that said compressor unit is connected to said second fluid line.

19. A kit as claimed in claim 13, wherein the connecting means comprise a cylindrical plug inserted inside said hose; and a tubular member connected in rotary manner to said cylindrical plug and housing said sensor.

20. A kit as claimed in claim 19, wherein said electric circuit comprises a first and second electric terminal embedded in said cylindrical plug.

21. Container assembly for a sealing fluid for inflatable articles comprising:
    a vessel containing said sealing fluid;
    a dispenser unit adapted to be connected fluidically to a compressor unit said dispenser unit having an electric circuit said circuit being adapted to determine a connection status to said inflatable article and allowing compressed air into said vessel and said sealing fluid out of said vessel;
    a hose for connecting said dispenser unit to a tyre; and
    a connecting device for connecting said hose to the tyre, said connecting device comprising first and second electrical terminals;
    said dispenser unit comprising a third and fourth electric terminal connected electrically to said first and second electric terminal respectively said electrical connection being designed such that when fluid is to flow through said fluid line, current flows to the compressor only if said terminals are short circuited.

22. A kit as claimed in claim 20, wherein said first and second terminal define respective stops for the axial movement of said sensor.

23. A kit as claimed in claim 22, wherein said first and second terminal project axially with respect to an axial end surface of said cylindrical plug, to keep said axial end surface and said sensor apart and to define a fluid flow passage.

* * * * *